(12) United States Patent
Shiokawa et al.

(10) Patent No.: US 8,942,475 B2
(45) Date of Patent: Jan. 27, 2015

(54) IMAGE SIGNAL PROCESSING DEVICE TO EMPHASIZE CONTRAST

(75) Inventors: Junji Shiokawa, Chigasaki (JP); Yuichi Nonaka, Yokohama (JP); Takeru Kisanuki, Fujisawa (JP)

(73) Assignee: Hitachi Maxell, Ltd., Osaka (JP)

( * ) Notice: Subject to any disclaimer, the term of this patent is extended or adjusted under 35 U.S.C. 154(b) by 814 days.

(21) Appl. No.: 12/785,810

(22) Filed: May 24, 2010

(65) Prior Publication Data

US 2010/0329553 A1  Dec. 30, 2010

(30) Foreign Application Priority Data

Jun. 30, 2009  (JP) ................................. 2009-154542

(51) Int. Cl.
| | | |
|---|---|---|
| G06K 9/00 | (2006.01) | |
| G06K 9/40 | (2006.01) | |
| H04N 5/228 | (2006.01) | |
| H04N 9/77 | (2006.01) | |
| H04N 5/202 | (2006.01) | |

(52) U.S. Cl.
CPC . *H04N 9/77* (2013.01); *H04N 5/202* (2013.01)
USPC .......................... 382/167; 382/274; 348/222.1

(58) Field of Classification Search
None
See application file for complete search history.

(56) References Cited

U.S. PATENT DOCUMENTS

| | | | | |
|---|---|---|---|---|
| 5,606,630 | A * | 2/1997 | Maeda et al. ................. | 382/254 |
| 2004/0175054 | A1 | 9/2004 | Ogata et al. | |
| 2005/0104974 | A1* | 5/2005 | Watanabe et al. .......... | 348/222.1 |
| 2005/0185837 | A1* | 8/2005 | Takano et al. ................. | 382/162 |
| 2006/0061842 | A1* | 3/2006 | Oka et al. ...................... | 358/522 |
| 2007/0080975 | A1* | 4/2007 | Yamashita et al. ............ | 345/591 |
| 2007/0081721 | A1* | 4/2007 | Xiao et al. ..................... | 382/167 |
| 2007/0188623 | A1* | 8/2007 | Yamashita et al. .......... | 348/222.1 |
| 2007/0229863 | A1* | 10/2007 | Ono et al. ...................... | 358/1.9 |
| 2007/0248282 | A1* | 10/2007 | Suzuki .......................... | 382/282 |
| 2007/0273793 | A1 | 11/2007 | Harada et al. | |
| 2008/0252791 | A1 | 10/2008 | Mitsunaga | |
| 2008/0317372 | A1* | 12/2008 | Kwon et al. ................... | 382/263 |
| 2009/0190832 | A1* | 7/2009 | Miyakoshi et al. ........... | 382/173 |
| 2010/0040283 | A1* | 2/2010 | Tsukioka ...................... | 382/167 |
| 2010/0085361 | A1* | 4/2010 | Kim et al. ..................... | 345/428 |
| 2010/0309346 | A1* | 12/2010 | Brunner et al. ............... | 348/254 |

FOREIGN PATENT DOCUMENTS

| | | |
|---|---|---|
| JP | 2000-156871 | 6/2000 |
| JP | 2004-023522 | 1/2004 |
| JP | 2007-318256 | 12/2007 |
| JP | 2008227945 A  * | 9/2008 |
| JP | 2008-263475 | 10/2008 |

* cited by examiner

*Primary Examiner* — Wenpeng Chen
(74) *Attorney, Agent, or Firm* — Antonelli, Terry, Stout & Kraus, LLP.

(57) ABSTRACT

An image signal processing apparatus, which includes a first area input-output characteristics control unit, which controls change of input-output characteristics for every arbitrary area associated with a value of an input luminance signal. The image signal processing apparatus also includes a second area input-output characteristics control unit, which controls change of input-output characteristics for every arbitrary area associated with an output of the first area input-output characteristics control unit, and a chrominance input-output characteristics control unit which controls the change of the input-output characteristics of an input chrominance signal by utilizing the output of the first area input-output characteristics control unit and the output of the second area input-output characteristics control unit.

11 Claims, 14 Drawing Sheets

INPUT IMAGE FRAME

FIG.12

|   |   |   |   |   |
|---|---|---|---|---|
| 1 | 2 | 2 | 2 | 1 |
| 2 | 4 | 4 | 4 | 2 |
| 2 | 4 | 4 | 4 | 2 |
| 2 | 4 | 4 | 4 | 2 |
| 1 | 2 | 2 | 2 | 1 | n=5 m=5

LOW-LUMINANCE
CORRECTION
CHARACTERISTICS

HIGH-LUMINANCE
CORRECTION
CHARACTERISTICS

IMAGE SIGNAL PROCESSING DEVICE TO EMPHASIZE CONTRAST

INCORPORATION BY REFERENCE

This application relates to and claims priority from Japanese Patent Application No. 2009-154542 filed on Jun. 30, 2009, the entire disclosure of which is incorporated herein by reference.

BACKGROUND OF THE INVENTION (1) Field of the Invention

The present invention relates to an image signal processing device and an image signal processing method.

(2) Description of the Related Art

As a related art of the present technical field, there is Japanese Patent Application Laid-Open 2007-318256, for example. The present patent document describes in its abstract of the disclosure as follows: "An image correction circuit capable of easily realizing adaptive color correction taking into account a luminance correction amount is provided. A gamma-correction circuit 21 applies luminance correction (contrast improving) to an input luminance signal Yin. Using an amount of luminance correction $\Delta Y$, a chrominance correction unit 3 performs chrominance correction on the basis of prescribed expression. Adaptive color correction interlocked with the amount of luminance correction $\Delta Y$ in the gamma-correction circuit 21 is realized. Furthermore, a denominator of the amount of luminance correction $\Delta Y$ is assumed to be fixed value L. Thereby, the circuit configuration is not made complicated. Furthermore, even in the case that, e.g. the amount of luminance correction $\Delta Y$ and the degree of adaptive color correction K are greater than required, it is avoided that color difference signals Uout and Vout after the chrominance correction become excessive, by means of the fixed value L being the denominator of $\Delta Y$ and the degree of adaptive color correction M satisfying 0<M=3."

As another related art of the present technical field, there is Japanese Patent Application Laid-Open 2000-156871, for example. The present patent document describes in its abstract of the disclosure as follows: "The present invention relates to an image processing device and an image processing method, and can be applied to an image processing device mounted in a television receiver, a video tape recorder, a television camera, and a printer, for example, to enable correction of gradation even in a dynamic image by avoiding partial deterioration of contrast effectively. After separating luminance data y (i, j) from image data x (i, j), a correction coefficient g (i, j) is generated based on determination result r (i, j) of an area to which the luminance data y (i, j) belongs, and the pixel value is corrected."

As a further another related art of the present technical field, there is Japanese Patent Application Laid-Open 2008-263475, for example. The present patent document describes in its abstract of the disclosure as follows: "According to each image, contrast correction is performed appropriately. An input-output characteristics setting unit generates an S-shaped input-output characteristics curve CL21 in which an output contrast component monotonically increases with respect to an input contrast component and a gradient becomes a maximum contrastGain/gamma_comp when the value of the input contrast component is around zero. A gain characteristics calculation unit generates a contrast gain curve indicating the characteristics of a gain value with respect to the input contrast component on the basis of the input-output characteristics curve CL21. A contrast correcting unit corrects the contrast component of each pixel on the basis of the contrast gain curve and a gain value which is calculated based on either the input contrast component or a luminance value. The present invention is applicable, for example, to a digital video camera."

As a yet another related art of the present technical field, there is Japanese Patent Application Laid-Open 2004-23522, for example. The present patent document describes in its abstract of the disclosure as follows: "An object of the present invention, is to provide a contrast correcting circuit which can reproduce a video of high contrast irrespective of video contents. The contrast correction circuit is provided with a gradation correction unit for correcting gradation of an input video signal, a unit for generating a luminance signal from the input video signal, a unit for dividing one picture into plural areas and calculating a mean value of a luminance signal for each area, a unit to generate a frequency distribution information of brightness based on luminance average value for every area, and a control unit for controlling input-output characteristics of the gradation correction unit based on the frequency distribution information of luminance."

SUMMARY OF THE INVENTION

Japanese Patent Application Laid-Open 2007-318256 describes "A luminance histogram distribution (not shown) of a luminance signal Yin is acquired for every image frame, and a luminance gain of a gamma-curve is determined adaptively for every image frame, based on the acquired luminance histogram distribution." In this way, in a correction process of gradation according to the conventional method, the entire gradation is corrected at the sacrifice of contrast of both ends of the curve, as is seen from the gamma-curve. Therefore, the conventional method causes a problem that contrast falls partially in the corrected image after all. Japanese Patent Application Laid-Open 2008-263475 and Japanese Patent Application Laid-Open 2004-23522 also cause the same problem.

In the method disclosed by Japanese Patent Application Laid-Open 2000-156871, it is necessary to save in a memory images corresponding to two frames, that is "an image pick-up result by normal exposure VN" and "an image pick-up result by short time exposure VS", accordingly, there arises a problem that a circuit scale becomes large.

The present invention aims at providing an image signal processing device for high-definition images. For example, the present invention aims at suppressing a noise in a low luminance part and a high luminance part and, at the same time, realizing a high contrast of the parts, and realizing high contrast of a characterizing part of the image as well. The present invention also aims at suppressing a phenomenon in which color tone becomes unnatural due to the change of ratio of a luminance signal to a chrominance signal, for example.

All or a part of the above-described problems are solved or improved by the invention.

According to the present invention, it is possible to provide an image signal processing device for high-definition images. For example, in a first area luminance signal correction unit and a first area input-output characteristics control unit (they are henceforth defined as a first area unit), a noise in a low luminance part and a high luminance part is suppressed, and a high contrast of the luminance parts concerned is realized. In a second area luminance signal correction unit and a second area input-output characteristics control unit (they are henceforth defined as a second area unit), parts with fewer signal distributions are utilized effectively and high contrast of a characterizing part of the image is realized. For example, as occasion arises, a point that a dynamic range of the entire screen becomes narrow due to the first area unit can be improved by the second area unit, and a point that contrast falls partially due to the second area unit can be improved by the first area unit. Furthermore, for example, as occasion arises, a point that a ratio of a luminance signal and a chrominance signal changes due to the first area unit and the second area unit can be improved by a color difference correction unit which corrects a color difference signal according to the ratio of an input luminance signal and an output of the first area unit.

A subject, constitution, and an effect of the invention will be clarified by explanation of the following embodiments.

BRIEF DESCRIPTION OF THE DRAWINGS

These and other features, objects and advantages of the present invention will become more apparent from the following description when taken in conjunction with the accompanying drawings wherein:

FIG. 12 is a drawing illustrating weighting in calculating an average at the time of detecting representative luminance;

DETAILED DESCRIPTION OF THE EMBODIMENT

Hereinafter, embodiments of the present invention will be explained with reference to the accompanying drawings.

Embodiment 1

Figure 1:
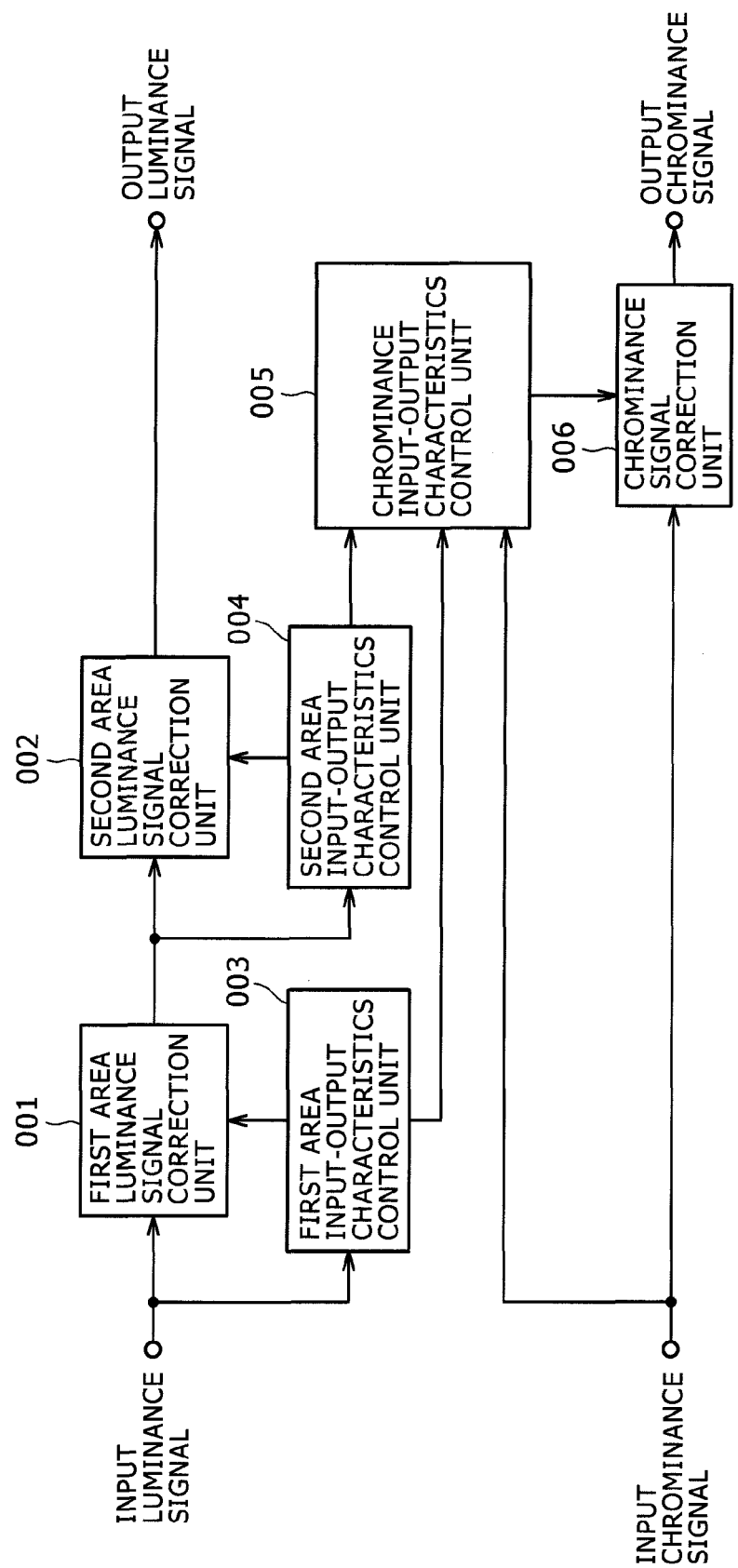
FIG. 1 is a drawing illustrating a concept of Embodiment 1 according to the present invention.

FIG. 1 illustrates a concept of Embodiment 1 according to the present invention.

A first area input-output characteristics control unit 003 performs control for changing input-output characteristics in an arbitrary small area of an image, using information on a local area which includes peripheral pixels of the arbitrary small area.

A first area luminance signal correction unit 001 corrects the input-output characteristics of an input luminance signal for every small area according to an output of the first area input-output characteristics control unit 003.

Figure 3:
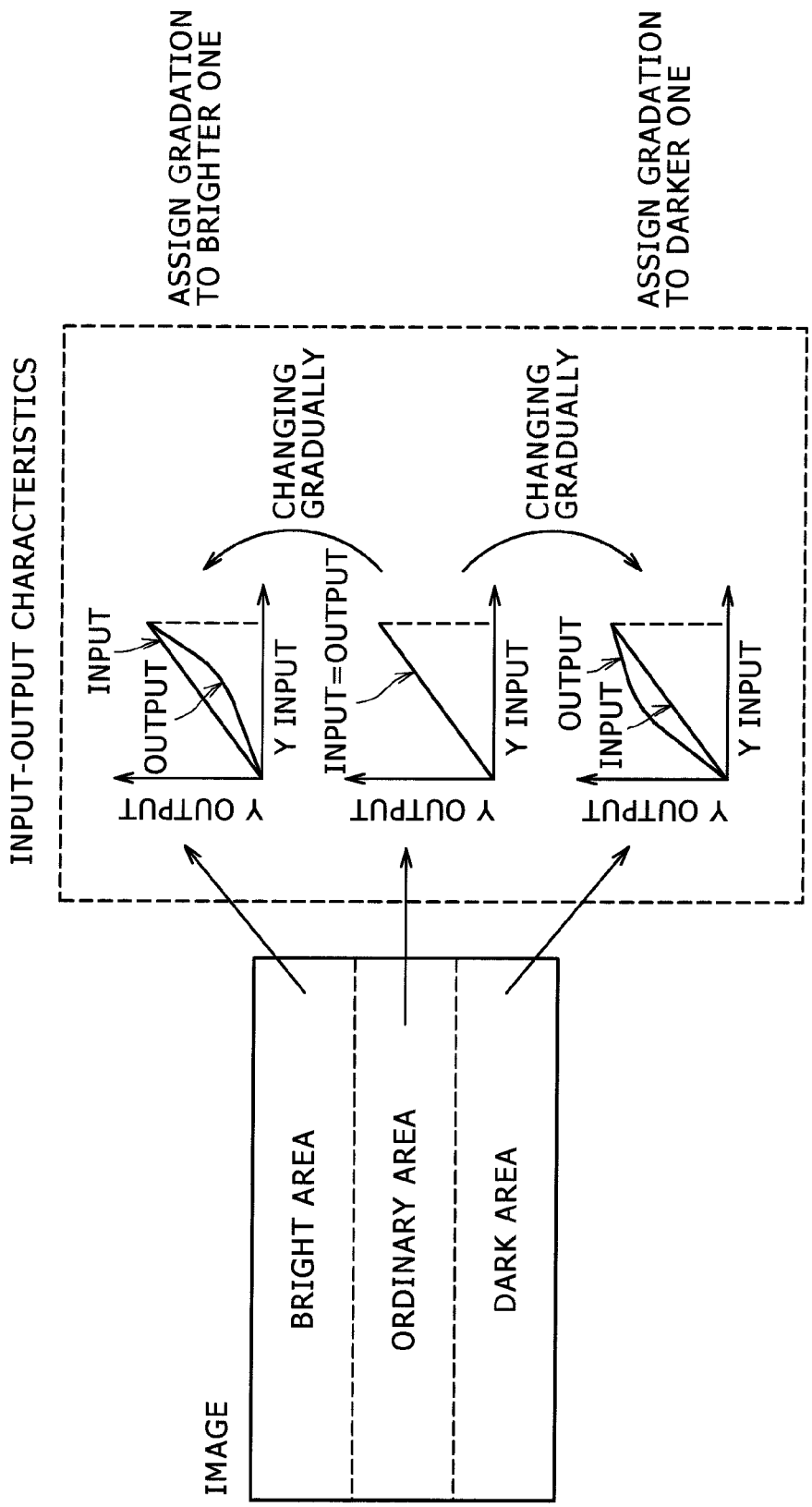
FIG. 3 is a drawing illustrating a concept of first area processing according to the present invention.

FIG. 3 illustrates an example of a concept of the first area unit. The left-hand side of FIG. 3 illustrates an input image which possesses a dark area like blocked-up shadows, a bright area like blown-out highlights, and an ordinary area with originally clear gradation. The right-hand side of FIG. 3 illustrates input-output characteristics for improving contrast of each area.

On the basis of the information on the local area, the first area input-output characteristics control unit 003 (FIG. 1) determines the brightness of the small area as one of three areas of the dark area, the ordinary area, and the bright area as illustrated in the left-hand side of FIG. 3, for example, and selects individual input-output characteristics as illustrated in the right-hand side of FIG. 3, in order to improve contrast. In this way, it becomes possible to suppress a rapid change of the input-output characteristics due to a noise, by utilizing the information on a local area for determining the brightness. When an output of a tone curve is utilized simply, the input-output characteristics will become discontinuous on a boundary of areas of which the brightness is different, and a rupture will appear in the image. Therefore, a rate of blending is calculated according to the brightness of a small area, and a signal is outputted by mixing an input and an output as illustrated in the graph of the input-output characteristics of FIG. 3. It is assumed that the information on a local area is an index value which is calculated by performing a predetermined weighting to the small area and its peripheral pixels. It is also preferable to assume that the predetermined weighting is to calculate a mean value. As for the rate of blending, in the case of a low luminance area, the smaller the index value is, the more the rate of blending is increased, and the greater the index value is, the more the rate of blending is decreased. In the case of a high luminance area, the greater the index value is, the more the rate of blending is increased, and the smaller the index value is, the more the rate of blending is decreased. Blending is not performed when the area is neither a high luminance part nor a low luminance part. In this way, the first area input-output characteristics control unit 003 realizes high contrast of a low luminance part and a high luminance part, while suppressing a noise in the parts.

A second area input-output characteristics control unit 004 (FIG. 1) performs control for changing uniformly input-output characteristics of the output of the first area luminance signal correction unit 001 (FIG. 1) for every arbitrary image areas.

A second area luminance signal correction unit 002 (FIG. 1) corrects the input-output characteristics of the luminance signal according to the output of the second area input-output characteristics control unit 004 (FIG. 1).

Figure 6A:
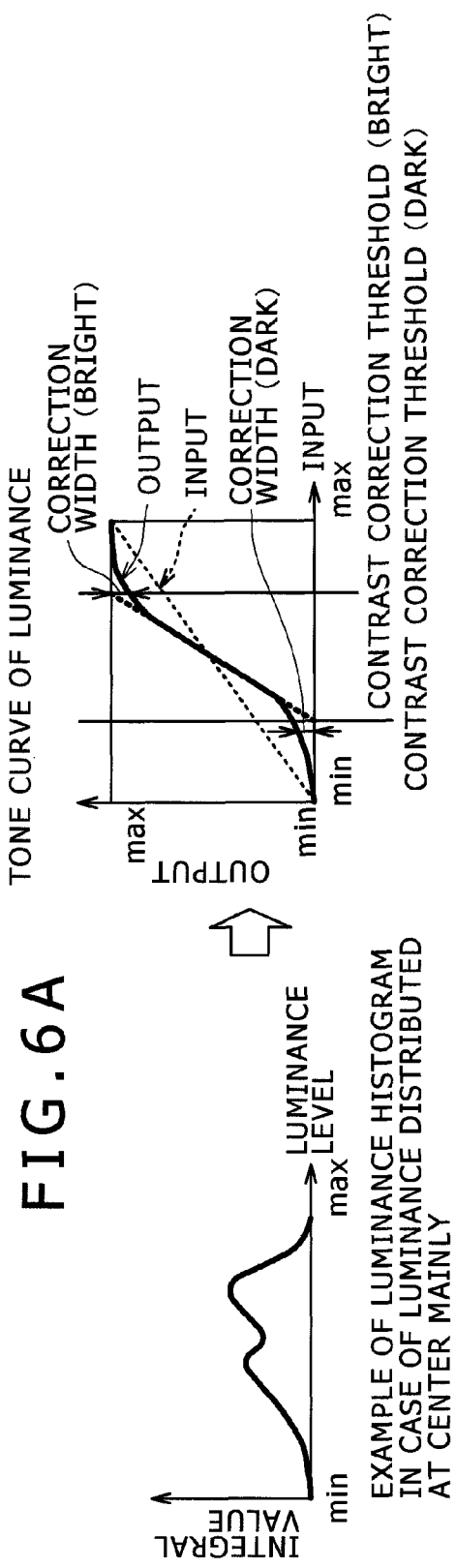
FIG. 6A is a drawing illustrating an example of a concept of second area processing according to the present invention.
Figure 6B:
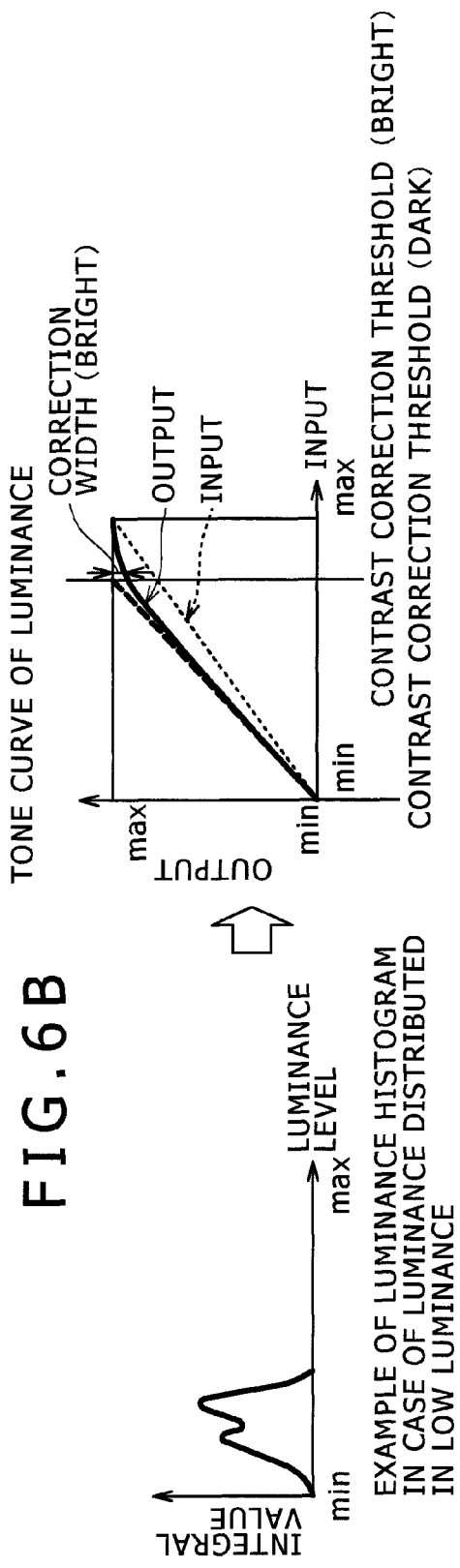
FIG. 6B is a drawing illustrating another example of a concept of the second area processing according to the present invention.

FIG. 6A and FIG. 6B illustrate an example of a concept of the second area unit. The second area unit captures the features of an image from an arbitrary image area employing a luminance histogram etc., and changes the input-output characteristics uniformly over a screen so as to impart the gradation of the characterizing part. As for the features of an image, when luminance is distributed mainly at the center, it is determined that the features are distributed over a middle luminance level and distributed little at a low luminance level and a high luminance level. The input-output characteristics are made to possess S-shaped characteristics in which gradation of a low luminance and a high luminance is suppressed and gradation of a middle luminance is expanded. When luminance is distributed mainly at a low luminance, it is determined that the features are distributed over a low luminance part and distributed little at a high luminance part. The input-output characteristics are corrected such that gradation is expanded in a low luminance part and suppressed in a high luminance part where little distribution exits originally. In this way, from the luminance distribution inputted, a part with little distribution and a part with much distribution are determined, and the shape and gradient of a tone curve are adjusted in accordance with the features of the distribution. Accordingly, a high contrast of the characterizing part of an image is realized by effectively using a part in which a signal distribution is few.

A chrominance input-output characteristics control unit 005 (FIG. 1) calculates change of a luminance signal from an output of the first area luminance signal correction unit 001 (FIG. 1) and an output of the second area luminance signal correction unit 002 (FIG. 1), and controls change of the input-output characteristics of a chrominance signal.

A chrominance signal correction unit 006 (FIG. 1) changes the input-output characteristics of the chrominance signal according to an output of the chrominance input-output characteristics control unit 005 (FIG. 1).

As an example, a color tone is decided by a ratio of a luminance signal to a chrominance signal; accordingly, when the input-output characteristics of the luminance signal are changed, the ratio may change and the color tone may become unnatural. For example, when a luminance signal is increased high in comparison with a chrominance signal in a low luminance area etc., the color becomes thin. In consideration of the above point, the input-output characteristics of the chrominance are changed corresponding to the change of the luminance. When the input-output characteristics of a chrominance signal is changed simply in proportion to the change ratio of the luminance, there arises a case where a color tone of inputs Y and C can not be reproduced with outputs Y and C, because signals (Y, C) and signals (R, G, B) differ in the scope of a color which can be expressed. Based on the above point and in consideration of the relation of (Y, C) and (R, G, B), the chrominance signal correction unit 006 changes the input-output characteristics of a chrominance signal to realize correction of the chrominance signal.

According to the embodiment described above, in the first area unit, a noise in a low luminance part and a high luminance part is suppressed, and a high contrast of the luminance parts concerned is realized. In the second area unit, parts with fewer signal distributions are utilized effectively and high contrast of a characterizing part of the image is realized. Moreover, a point that a dynamic range of the entire screen becomes narrow due to the first area unit can be improved by the second area unit, and a point that contrast falls partially due to the second area unit can be improved by the first area unit. Furthermore, a point that a ratio of a luminance signal and a chrominance signal changes due to the first area unit and the second area unit can be improved by a color difference correction unit which corrects a color difference signal according to the ratio of an input luminance signal and an output of the first area unit.

Embodiment 2

Figure 2:
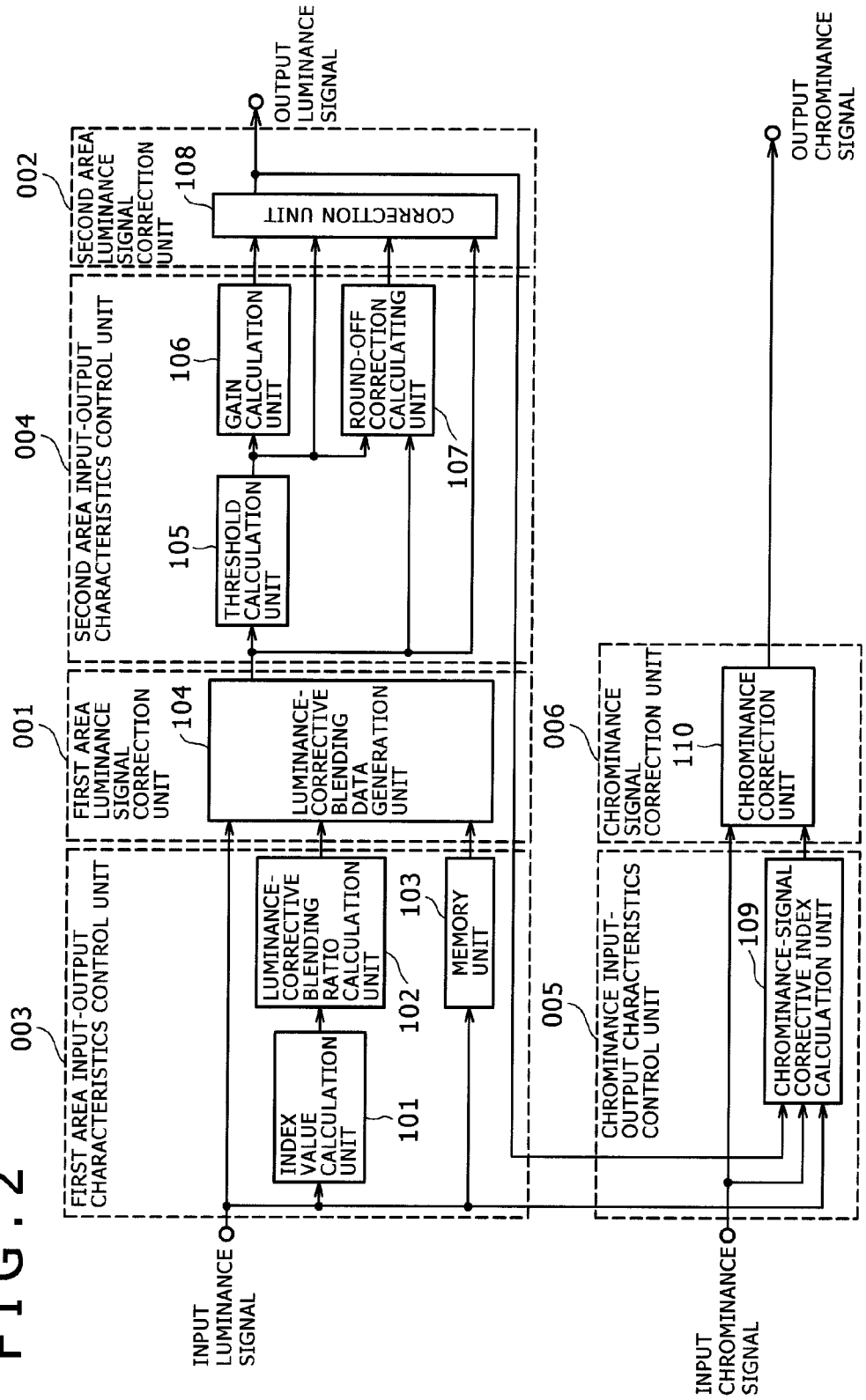
FIG. 2 is a drawing illustrating a concept of Embodiment 2 according to the present invention.

FIG. 2 illustrates a conceptual diagram of Embodiment 2 according to the present invention.

An index value calculation unit 101 outputs an index value which is calculated by performing predetermined weighting to a central pixel and its peripheral pixels of an input luminance signal. It is also preferable to assume that the predetermined weighting is to calculate a mean value.

A luminance-corrective blending ratio calculation unit 102 calculates and outputs a blending ratio with which an output of a memory unit 103 and the input luminance signal are blended.

Figure 4:
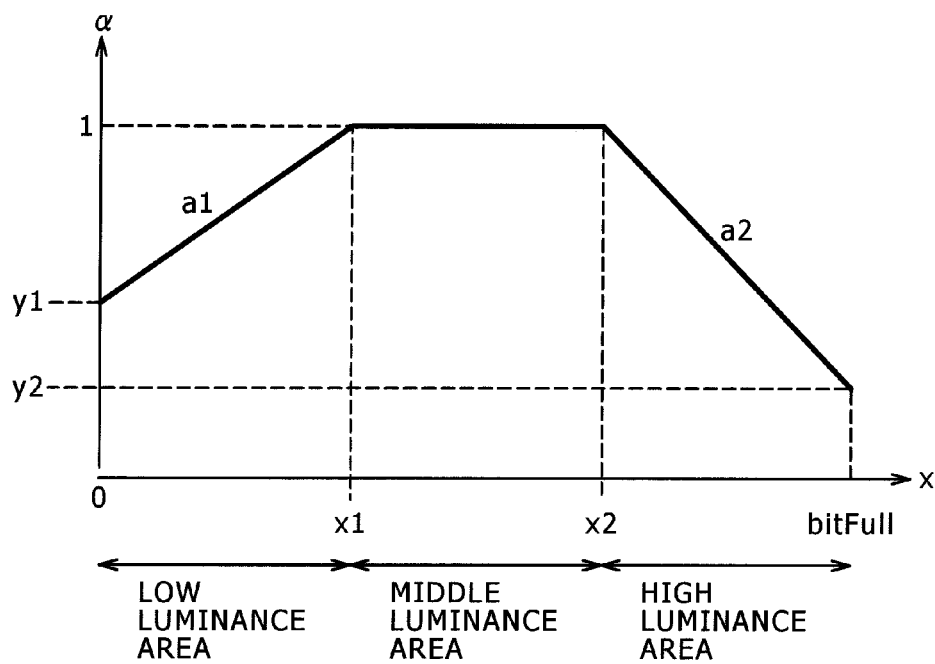
FIG. 4 is a drawing illustrating an example of a blending ratio calculation method for luminance correction according to the present invention.

FIG. 4 illustrates an example of a blending ratio calculation method for luminance correction. In FIG. 4, a symbol x expresses an index value used as an output of the index value calculation unit 101 (FIG. 2). A symbol x1 expresses a threshold indicative of a low luminance area. A symbol x2 expresses a threshold indicative of a high luminance area. A symbol y1 expresses an intercept of the low luminance area. A symbol y2 expresses an intercept of the high luminance area. A symbol a1 expresses a gradient of the low luminance area. A symbol a2 expresses a gradient of the high luminance area. A symbol bitFull expresses a bit length indicative of the maximum available value of the input luminance signal. A symbol Y_a expresses a blending ratio. Here, the blending ratio Y_a is given by the following equations: When the index value is less than x1, $$Y\_a = a1*(x/\text{bitFull}) + y1.$$

When the index value is greater than x2, $$Y\_a = a2*((\text{bitFull}-x)/\text{bitFull}) + y2.$$

In the other conditions, $$Y\_a = 1.$$

The setting values other than x use optimal setting values calculated in advance by performing quantitative evaluation of an actual image. Accordingly, reduction of an operation amount can be realized.

The memory unit 103 (FIG. 2) outputs memory data set up in advance in response to an input luminance as a reading address.

Figure 5B:
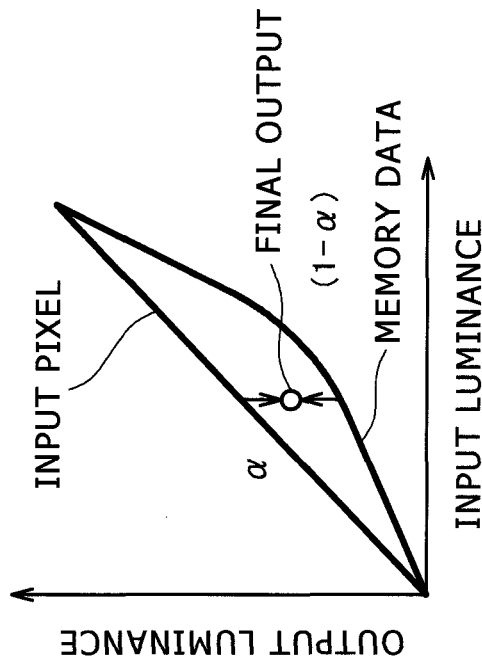
FIG. 5B is a drawing illustrating another example of a blending data generation method for luminance correction according to the present invention.
Figure 5A:
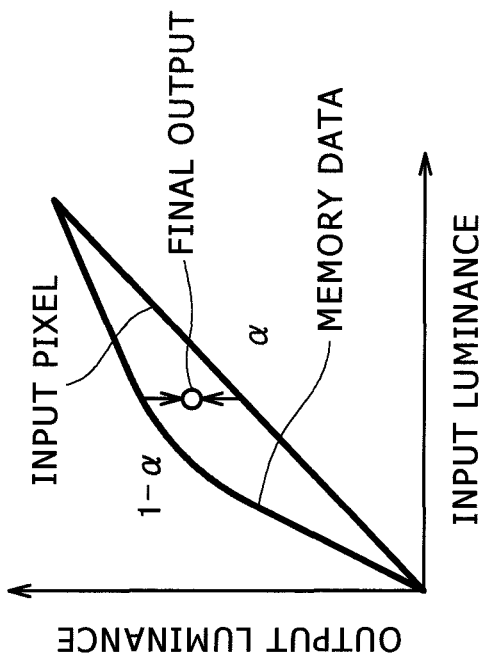
FIG. 5A is a drawing illustrating an example of a blending data generation method for luminance correction according to the present invention.

FIG. 5A and FIG. 5B illustrate an example of a method to calculate a corrected pixel. The memory data to be outputted here is what is used as characteristics to impart gradation to the input luminance. The value of the memory data uses an optimal setting value calculated in advance by performing quantitative evaluation of an actual image. Accordingly, reduction of an operation amount can be realized. A symbol a serves as an output of the luminance-corrective blending ratio calculation unit 102 (FIG. 2). The memory data and a sign coefficient serve as the output of the memory unit 103 (FIG. 2). The output Y which serves as a corrected pixel is calculated by the following equation, $$\text{output } Y = a*\text{input luminance} + (1-a)*\text{memory data}.$$

As described above, a luminance-corrective blending data generation unit 104 (FIG. 2) suppresses a noise in a low luminance part and a high luminance part and realizes a high contrast of the luminance parts, by use of the input luminance signal, the output of the luminance-corrective blending ratio calculation unit 102 (FIG. 2), and the output of the memory unit 103 (FIG. 2).

A threshold calculation unit 105 (FIG. 2) captures the features of an image from an arbitrary area by employing a luminance histogram etc., and outputs a control signal for changing the input-output characteristics uniformly over a screen so as to impart the gradation of the characterizing part.

FIG. 6A and FIG. 6B illustrate an example of a concept of the second area processing. As illustrated in FIG. 6A and FIG. 6B, the output of the threshold calculation unit 105 (FIG. 2) is corrected by a contrast correction threshold (dark), a contrast correction threshold (bright), a round-off correction gain (dark) which serves as a control signal for controlling a degree of the round-off correction width (dark), and a round-off correction gain (bright) which serves as a control signal for controlling a degree of the round-off correction width (bright). Now an example of a luminance histogram for a case where luminance is largely distributed at the center is explained. As illustrated in FIG. 6A, the contrast correction threshold (dark) sets up a luminance level at a border across which the luminance distribution increases in the low luminance part, based on the histogram of the input luminance detected by the threshold calculation unit 105 (FIG. 2). The contrast correction threshold (bright) sets up a luminance level at a border across which the luminance distribution decreases in the high luminance part, based on the histogram of the input luminance. A round-off correction calculating unit 107 (FIG. 2) performs processing to provide smooth characteristics to a signal in the neighborhood of the contrast correction threshold (dark) and to a signal in the neighborhood of the contrast correction threshold (bright), so that a level difference etc. may not be conspicuous. The round-off correction gain (dark) and the round-off correction gain (bright) serve as control signals which adjust the degree of the round-off correction width (dark) and the degree of the round-off correction width (bright), respectively. Such setting values may be selected from setting values which are prepared in advance for every pattern of an input luminance histogram, after performing quantitative evaluation of an actual image in advance to calculate an optimal value for every pattern of the histogram. By use of such constitution, it is possible to realize reduction of an operation amount.

A gain calculation unit 106 (FIG. 2) calculates a gradient to be multiplied to the input luminance from an output of the threshold calculation unit 105 (FIG. 2), and outputs the calculated gradient.

Figure 7:
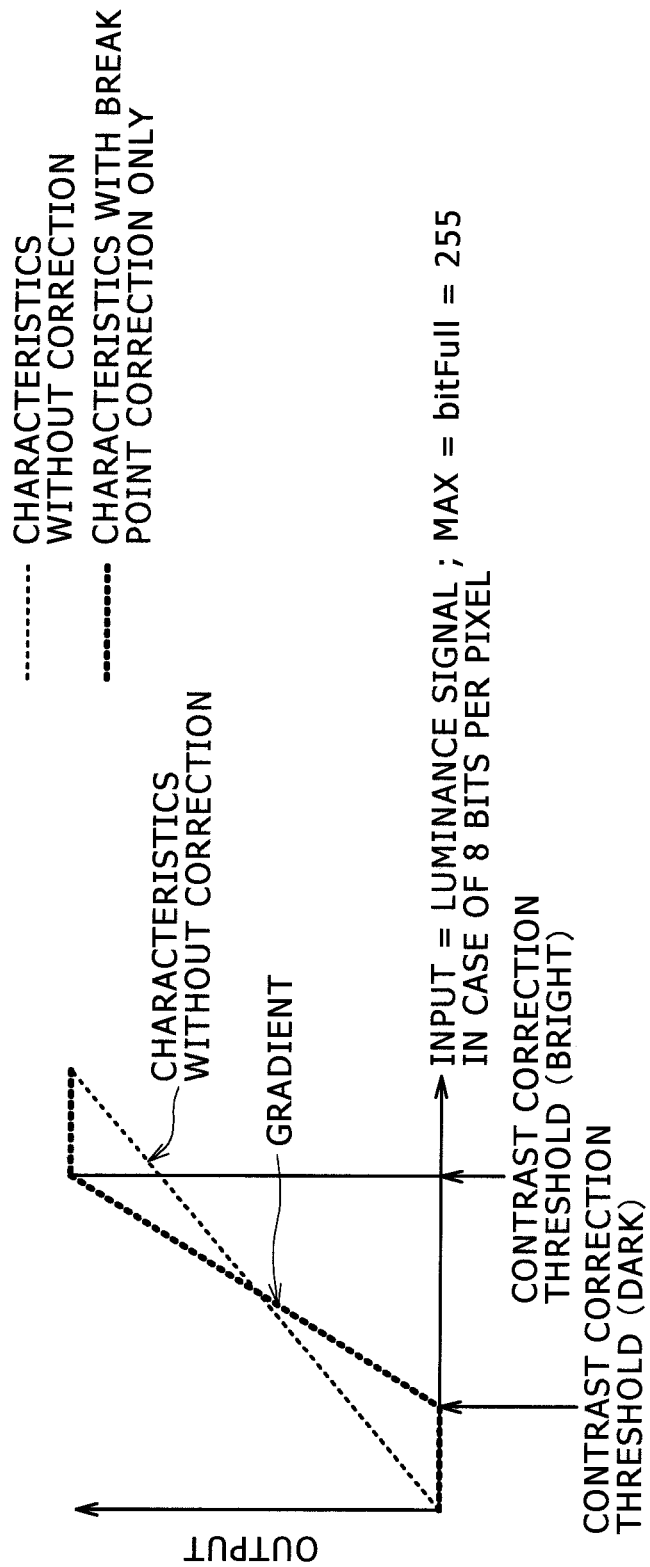
FIG. 7 is a drawing illustrating an example of a gradient calculation method according to the present invention.

FIG. 7 illustrates an example of a method for calculating a gradient in the gain calculation unit 106 (FIG. 2). Here, the gradient is calculated by the following equation, gradient=bitFull/(contrast correction value(bright)−contrast correction value(dark)).

Using the input luminance signal and the output of the threshold calculation unit 105 (FIG. 2), the round-off correction calculating unit 107 (FIG. 2) outputs a round-off correction data for providing smooth characteristics to a signal in the neighborhood of the contrast correction threshold (dark) and to a signal in the neighborhood of the contrast correction threshold (bright), so that a level difference etc. may not be conspicuous.

Figure 8:
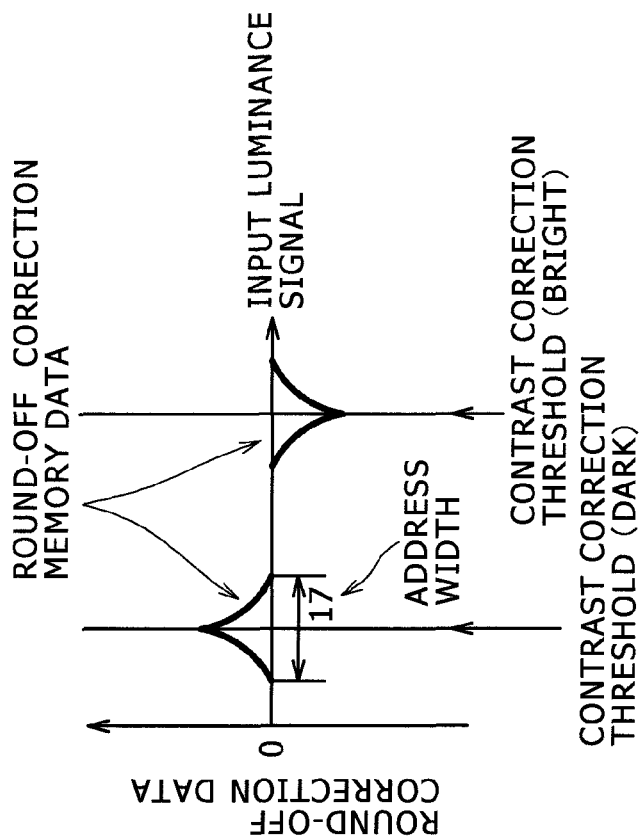
FIG. 8 is a drawing illustrating an example of a round-off correction data calculation method according to the present invention.

FIG. 8 illustrates an example of a method for calculating round-off correction data in the round-off correction calculating unit 107 (FIG. 2). Here, the round-off correction data is calculated by the following equations.

When (contrast correction threshold(dark)−((memory address size−1)/2))=correction target pixel=(contrast correction threshold(dark)+((memory address size−1)/2));

then, round-off correction memory address=correction target pixel−contrast correction threshold(dark)−((memory address size−1)/2), and round-off correction data=memory data(round-off correction memory address)*round-off correction gain(dark).

When (contrast correction threshold(bright)−((memory address size−1)/2))=correction target pixel=(contrast correction threshold (bright)+((memory address size−1)/2)), then round-off correction memory address=correction target pixel−contrast correction threshold(bright)−((memory address size−1)/2), and round-off correction data=−1*memory data(round-off correction memory address)*round-off correction gain(bright).

In the other conditions, round-off correction data=0.

The memory data described above is assumed to possess characteristics which smoothens a level difference in the neighborhood of the threshold. The value of the memory data uses an optimal setting value calculated in advance by performing quantitative evaluation of an actual image. Accordingly, reduction of an operation amount can be realized.

A correction unit 108 (FIG. 2) outputs correction data by calculating the correction data from an output of the threshold calculation unit 105 (FIG. 2), an output of the gain calculation unit 106 (FIG. 2), and an output of the round-off correction calculating unit 107 (FIG. 2).

Figure 9:
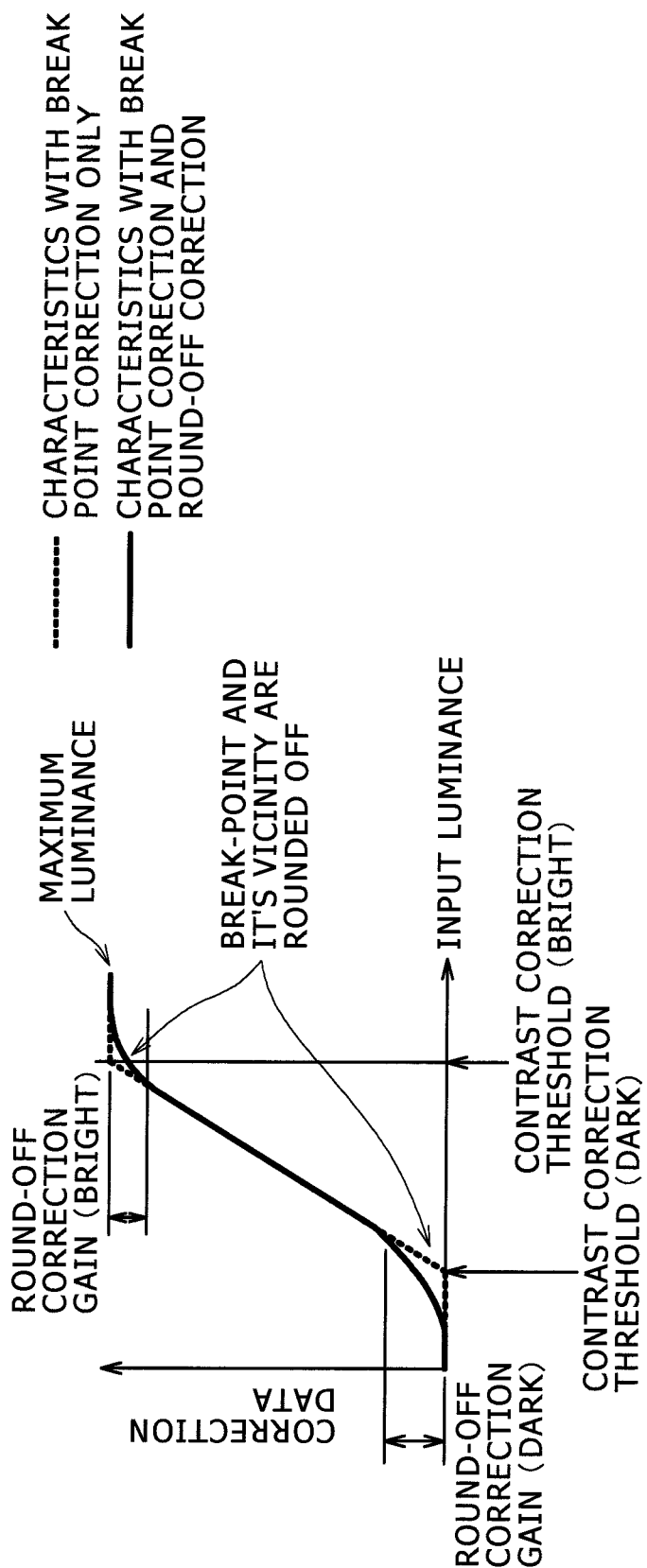
FIG. 9 is a drawing illustrating an example of a correction data calculation method according to the present invention.

FIG. 9 illustrates an example of a correction data calculation method in the correction unit 108 (FIG. 2). Here, the correction data is calculated by the following equation, correction data=(input luminance signal−contrast correction(dark))*gradient+round-off correction data.

However, in the case of (input luminance signal−contrast correction(dark))<0, correction data=0.

A chrominance-signal corrective index calculation unit 109 (FIG. 2) calculates change of a luminance signal from the input luminance and an output of the correction unit 108 (FIG. 2), and outputs a rate of luminance change and a chrominance correction data which change the input-output characteristics of the chrominance signal.

As an example, an equation to calculate the rate of luminance change is given by (input luminance)/(output luminance of the correction unit 108 (FIG. 2)). The chrominance correction data serves as data for correcting a phenomenon in which a color tone becomes unnatural when it is assumed that (output chrominance signal)=(chrominance signal)*(rate of luminance change). As a concept, when the input-output characteristics of a chrominance signal is changed in proportion to the change ratio of the luminance, there arises a case where a color tone of inputs Y and C can not be reproduced with outputs Y and C, because signals (Y, C) and signals (R, G, B) differ in the scope of a color which can be expressed. Based on the above point, the chrominance correction data serves as data for correcting the input-output characteristics of the chrominance signal, in consideration of the relation of (Y, C) and (R, G, B) as well. The correction data is changed by the relation of luminance and components Cr and Cb of a chrominance signal.

A chrominance correction unit 110 (FIG. 2) calculates color data after correction from the input chrominance signal and an output of the chrominance-signal corrective index calculation unit 109 (FIG. 2), and outputs the corrected color data. As an example, the color data after correction is given by (rate of luminance change)*(input chrominance signal)+(chrominance correction data).

According to the embodiment described above, while enhancing reduction of an operation amount, in the first area unit, a noise in a low luminance part and a high luminance part is suppressed, and a high contrast of the luminance parts concerned is realized; and in the second area unit, parts with fewer signal distributions are utilized effectively and high contrast of a characterizing part of the image is realized. Moreover a point that a dynamic range of the entire screen becomes narrow due to the first area unit can be improved by the second area unit, and a point that contrast falls partially due to the second area unit can be improved by the first area unit. Furthermore, a point that a ratio of a luminance signal and a chrominance signal changes due to the first area unit and the second area unit can be improved by a color difference correction unit which corrects a color difference signal according to a ratio of an input luminance signal to an output of the first area unit.

Embodiment 3

Figure 10:
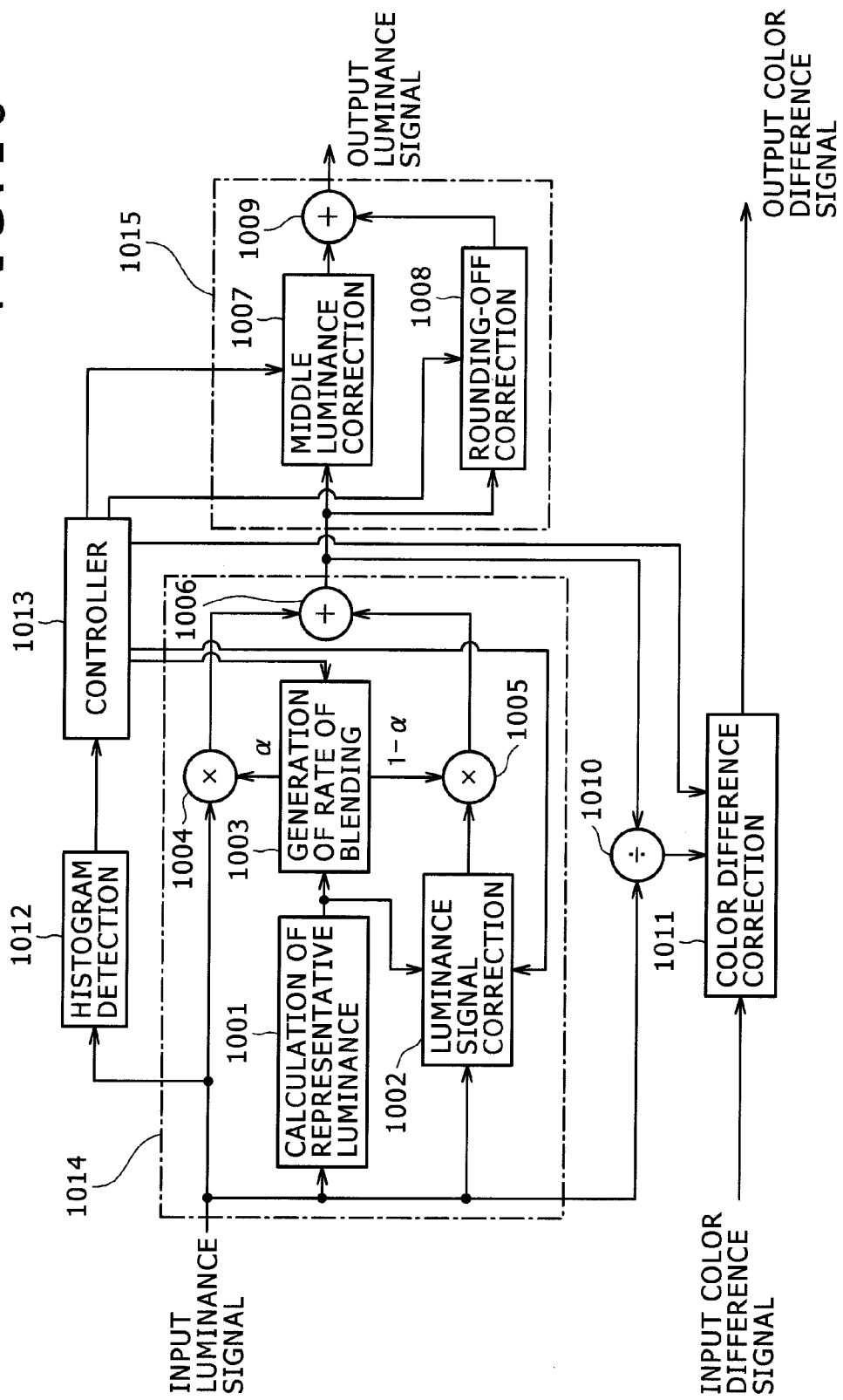
FIG. 10 is a block diagram of Embodiment 3 according to the present invention.

FIG. 10 illustrates an image signal processing device according to Embodiment 3 of the present invention.

In FIG. 10, a block 1014 is a first contrast correcting circuit and a block 1015 is a second contrast correcting circuit. A signal flow in FIG. 10 is explained in the following. A representative luminance level of a prescribed area in an input luminance signal is first calculated by a representative luminance calculation circuit 1001, and the input luminance signal is corrected to predetermined characteristics by a luminance signal correction circuit 1002. The input-output characteristics of the luminance signal correction circuit 1002 are described later.

According to an output of the representative luminance calculation circuit 1001, a rate-of-blending generation circuit 1003 generates a predetermined rate of blending a (0=a=1). An output of the luminance signal correction circuit 1002 is multiplied by (1−a) by a multiplier circuit 1005, and an input luminance signal is multiplied by a by a multiplier circuit 1004. An output of the multiplier 1004 and an output of the multiplier 1005 are added in an adder circuit 1006, and serve as an output of the first contrast correcting circuit 1014. Therefore, the first contrast corrected output becomes such that the larger the value of a is, the higher the ratio of the input luminance signal is, and such that the smaller the value of a is, the higher the ratio of the luminance signal corrected by the luminance signal correction circuit 1002 is.

Furthermore, the first contrast corrected output undergoes correction of a middle luminance component by a middle luminance correction circuit 1007, and at the same time, rounding-off of a signal of a high luminance part and a signal of a low luminance part is performed by a round-off correction circuit 1008. An output of the middle luminance correction circuit 1007 and an output of the round-off correction circuit 1008 are added in an adder circuit 1009 and an output luminance signal to which the final contrast correcting has been applied is outputted from the second contrast correcting circuit 1015.

In a divider circuit 1010, a ratio of the input luminance signal to the output of the adder circuit 1006 is calculated, and, according to the ratio, a color difference signal is corrected by a color difference correction circuit 1011. Therefore, the correction of the color difference signal according to the amount of correction of the luminance signal can be performed. According to the present processing, when the correction by the first contrast correcting is performed to make brighter a low luminance part of the input luminance signal, the color difference signal of the pixel which is corrected to be brighter is also corrected with emphasis. Accordingly, excellent contrast and color reproduction can be attained in the final output luminance signal and output color difference signal. The color difference signal correction ratio is set up individually to Cr or Pr, and Cb or Pb (as prescribed by the International Telecommunications Union, ITU-R BT.601, or ITU-R BT.709-3 Part II). By the present scheme, it is possible for a controller to control the color tone in the color difference correction circuit 1011.

A luminance signal distribution of the input luminance signal is detected by a histogram detection circuit 1012, and the detection result is supplied to a controller 1013. Based on the detection result, the controller 1013 sets respective control parameters (to be described later) to the rate-of-blending detection circuit 1003, the middle luminance correction circuit 1007, the round-off correction circuit 1008, and the color difference correction unit 1011.

Figure 11:
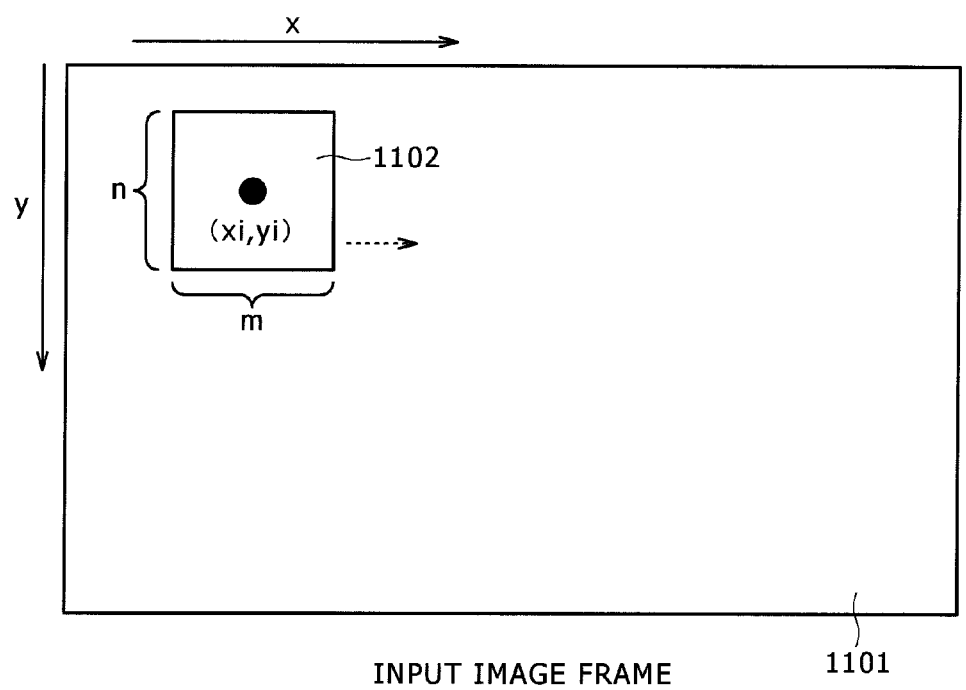
FIG. 11 is a schematic diagram illustrating operation of representative luminance detection.

Next, operation of detecting representative luminance by the representative luminance detection circuit 1001 is explained with reference to FIG. 11. In FIG. 11, an area 1101 illustrates one image frame of an input luminance signal entered in the representative luminance detection circuit 1001 (FIG. 10). Assuming that the horizontal direction of the one image frame is the x-axis, the vertical direction is the y-axis, and an arbitrary pixel is (xi, yi), representative luminance of the pixel of (xi, yi) is given by calculating a mean value of luminance of an area 1102 centering at (xi, yi) and surrounded by a horizontal width m and a vertical width n. Each representative luminance of all the pixels of the input image frame is obtained by moving the present area on a pixel-by-pixel basis.

In stead of the mean value, the representative luminance of the area 1101 may be calculated by increasing weight of a pixel locating near the center (xi, yi) of the area 1102, and by gradually decreasing weight of a pixel locating far from the center (xi, yi).

Figure 12:
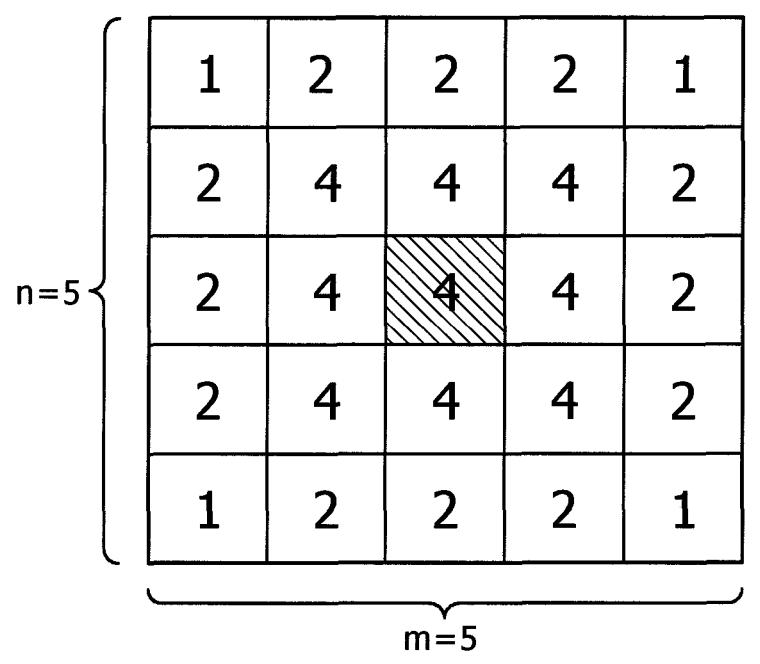

FIG. 12 illustrates a case where the area 1102 of FIG. 12 is composed of horizontal pixels of m=5 and vertical pixels of n=5. FIG. 12 shows the weighting factors to be multiplied to a value of each pixel composing the area 1102 in calculating the representative luminance of a central pixel (shaded portion) of the area. The representative luminance can be calculated by multiplying each of these factors to data of the corresponding pixel which composes the area, taking the summation, and dividing it by 64. In the case of the present example, all the multiplication is operation of an exponentiation of two; accordingly the multiplication operation of each pixel can be performed by a shift operation in a digital circuit. Furthermore, the division by 64 to calculate the mean value can be performed also by the shift operation. Therefore, the present example possesses advantage that the circuit implementation is easy and that the representative luminance can be calculated, removing influence of a high-frequency component of the input luminance signal of the area.

Figure 13A:
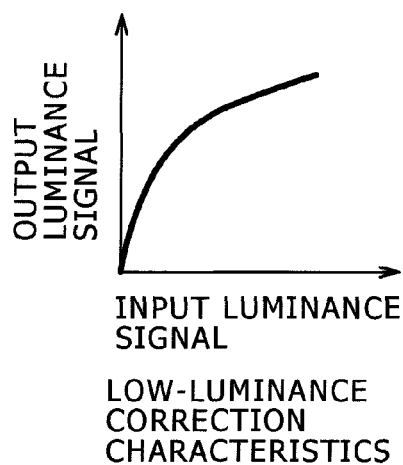
FIG. 13A is a drawing illustrating an example of low-luminance correction characteristics.
Figure 13B:
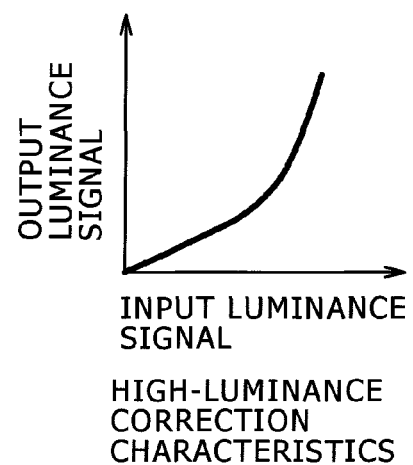
FIG. 13B is a drawing illustrating an example of high-luminance correction characteristics.
Figure 13C:
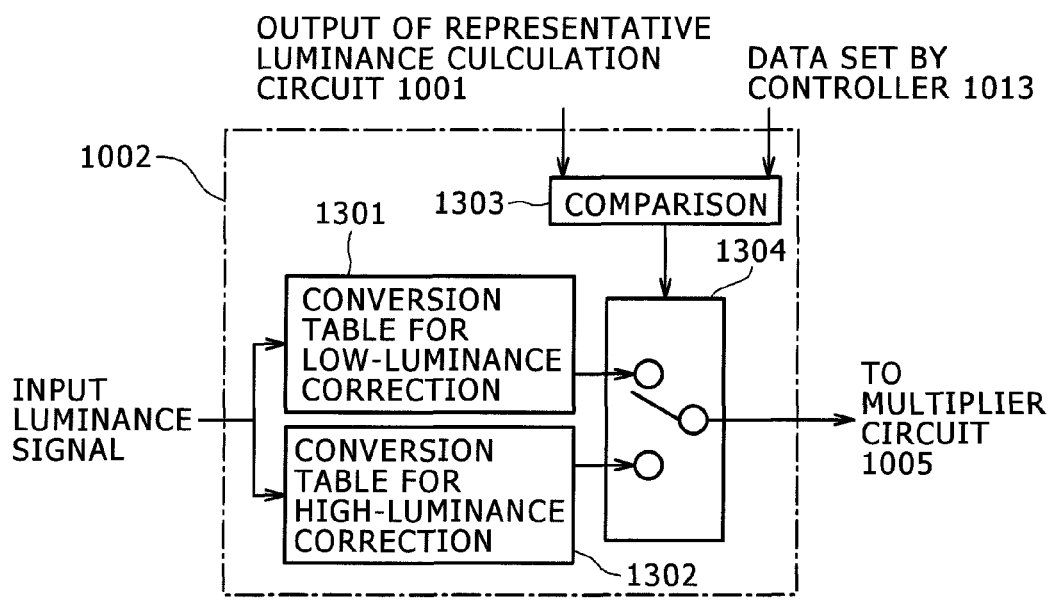
FIG. 13C is a block diagram illustrating details of a luminance correction circuit 1002 (FIG. 10)

Next, input-output characteristics and constitution of the luminance signal correction circuit 1002 illustrated in FIG. 10 are explained, with reference to FIG. 13A, FIG. 13B, and FIG. 13C. In FIG. 13C, a block 1002 is the same as the luminance signal correction circuit illustrated in FIG. 10. An input luminance signal is corrected by a conversion table for low-luminance correction 1301 and a conversion table for high-luminance correction 1302. In the conversion table for low-luminance correction 1301, the correction characteristics raise a low luminance pixel to the high luminance side by the low-luminance correction characteristics of FIG. 13A; accordingly the contrast is increased. In the conversion table for high-luminance correction 1302, the correction characteristics lowers a high luminance pixel to the low luminance side by the high-luminance correction characteristics of FIG. 13B; accordingly the contrast is increased. Each of the corrected outputs is supplied to a switch 1304. On the other hand, the representative luminance obtained by the representative luminance calculation circuit 1001 and the thresholds of the low luminance and high luminance set up by the controller 1013 are compared by a comparison circuit 1303. With the use of the comparison result output, either the output of the conversion table for low-luminance correction 1301 or the output of the conversion table for high-luminance correction 1302 is selected and outputted by the switch 1304; accordingly, the output of the luminance signal correction circuit 1002 is obtained.

Next, the operation of the rate-of-blending generation circuit 1003 and the controller circuit 1013, which are illustrated in FIG. 10, is explained with reference to FIG. 4. In FIG. 4, the vertical axis expresses rate of blending a (0≦a≦1) which indicates addition ratio of an output of the luminance signal correction circuit 1002 (FIG. 10) and an input luminance signal (FIG. 10). The horizontal axis expresses level of representative luminance which is an output of the representative luminance calculating unit 1001 (FIG. 10).

As shown in FIG. 4, the representative luminance level is divided into a low luminance area, a middle luminance area, and a high luminance area ("bitFull" is the maximum that the representative luminance can take). In the low luminance area, the rate of blending a is decided by a gradient a1 starting from a gradient start point y1. In the middle luminance area, the rate of blending a=1, and in the high luminance area, the rate of blending a is decided by a gradient a2.

By adopting the constitution in which arbitrary values of the parameters of FIG. 4, that is, the gradient a1 and a2, the thresholds x1 and x2 which separate the low luminance area, the middle luminance area, and the high luminance area, the minimum y1 of the rate of blending a in the low luminance area, and the minimum y2 of the rate of blending a in the high luminance area, can be set to the rate-of-blending generation circuit from the controller 1013 illustrated in FIG. 10, it becomes possible to adjust the strength of the first contrast correction effect, or can turn on and turn off the contrast correction (when it is set that y1=y2=1, the contrast correction turns off).

Figure 14A:
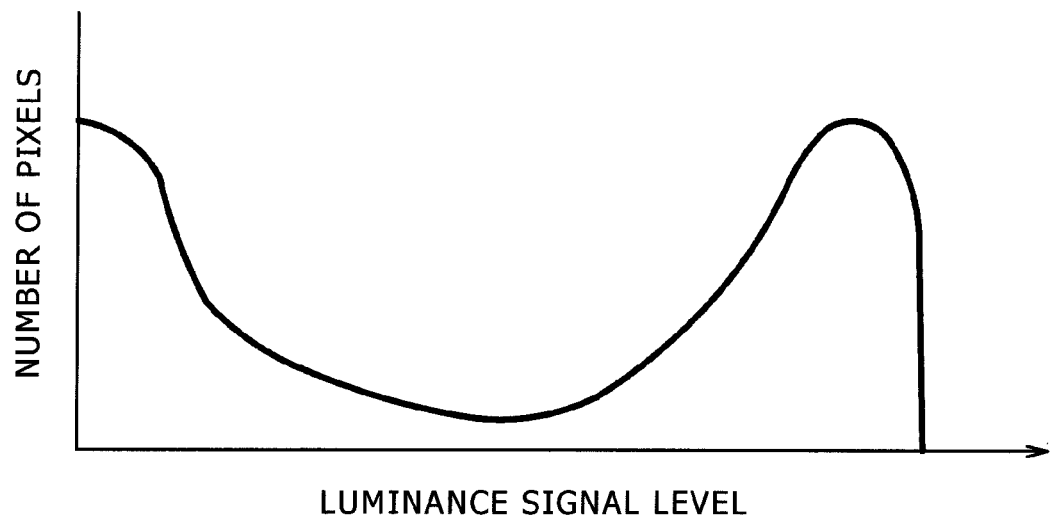
FIG. 14A is a drawing illustrating an example of a histogram of an input luminance signal.
Figure 14B:
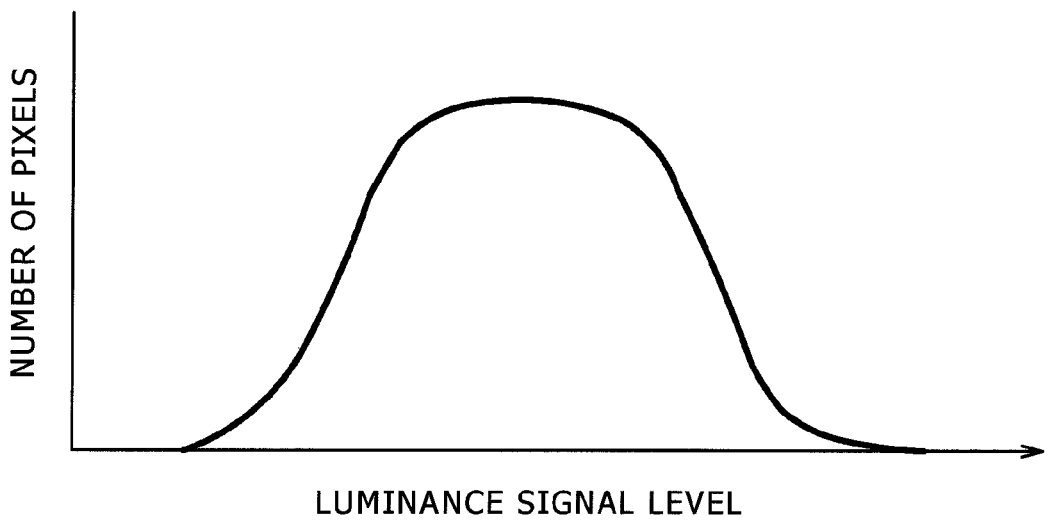
FIG. 14B is a drawing illustrating another example of a histogram of the input luminance signal.

For example, when the histogram of an input luminance signal which the histogram detection circuit 1012 (FIG. 10) has detected is distributed in the low luminance area and the high luminance area, like a histogram illustrated in FIG. 14A, it is possible to enhance the effect of the first contrast correction, by decreasing the value of the minimum y1 of the rate of blending a in the low luminance area and the value of the minimum y2 of the rate of blending a in the high luminance area. On the contrary, when the histogram of the input luminance signal exhibits little luminance signal distribution in the low luminance area and the high luminance area like a histogram illustrated in FIG. 14B, it is possible to control to nullify the effect of the first contrast correction, by setting the value of the minimum y1 of the rate of blending a in the low luminance area to one and the value of the minimum y2 of the rate of blending a in the high luminance area to one.

Next, operation of the middle luminance correction circuit 1007 and the round-off correction circuit 1008 and the controller circuit 1013, which are illustrated in FIG. 10, is explained with reference to FIG. 9. As shown in a dashed line of FIG. 9, a signal inputted from the first contrast correcting circuit 1014 is corrected so that contrast of the middle luminance may be emphasized further, and, at the same time, the inputted signal undergoes a round-off correction process by the round-off correction circuit 1008 so that luminance of the signal does not become discontinuous in a part of zero luminance and in a part of the maximum luminance of the dashed line. An output of the middle luminance correction circuit 1007 and an output of the round-off correction circuit 1008 are added in the adder circuit 1009; accordingly, the input-output characteristics drawn by a solid line of FIG. 9 are obtained.

As described above, according to Embodiment 3, even for an image frame which is formed especially by high luminance and low luminance, representative luminance is calculated sequentially for every area on a pixel-by-pixel basis, and the first contrast correction is performed with the use of the representative luminance, in which the high luminance part and the low luminance part are corrected to the middle luminance. In addition, the second contrast correction is performed so that the middle luminance part is emphasized further. By these corrections, the high luminance part and the low luminance part are both enhanced in degree of gradation; in addition, the color difference signal is corrected especially in connection with the degree that the low luminance part is corrected to the middle luminance part. Therefore, it is possible to improve the contrast of the input image, and it is also possible to improve the color tone in accordance with the degree of the contrast correction.

In the above, suitable embodiments concerning the present invention have been explained, referring to the accompanying drawings. However, it cannot be overemphasized that the present invention is not limited to the examples. It should be clear that those skilled in the art may think out, in a category of the technical idea described in the scope of the appended claims, various kinds of modifications and corrections, and it should be understood that those modifications and corrections naturally belong to the technical scope of the present invention.

For example, the above-described embodiments are detailed examples for explaining the present invention plainly, and the present invention is not necessarily limited to what is provided with all the constitution explained therein. It is possible to replace a part of the constitution of a certain embodiment with a part of or all of the constitution of other embodiments, and it is also possible to add to the constitution of a certain embodiment a part of or all of the constitution of other embodiments.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image signal processing device comprising:
a histogram detecting unit, configured to detect a luminance distribution of an image represented by an input luminance signal;
a representative luminance calculating unit, configured to detect a representative luminance in a predetermined area of the image represented by the input luminance signal;
a first luminance correction unit, configured to:
associate the predetermined area of the image to a brightness area of the image, wherein a plurality of brightness areas include: a dark area, an ordinary area, and a bright area, wherein each brightness area has a respective input-output characteristic function, and wherein at least the input-output characteristic function of the dark area is different from the input-output characteristic function of the bright area, and
change input-output characteristic functions of the input luminance signal representing the image, according to an output of the representative luminance calculating unit, by:
gradually adjusting the input-output characteristic functions of the input luminance signal for the predetermined area of the image, and
suppressing any abrupt change of the input-output characteristic functions due to noise, thereby inhibiting a rupture of the image generated when an input-output characteristic function is discontinuous;
a second luminance correction unit, configured to correct an output of the first luminance correction unit;
a color difference correction unit, configured to correct a color difference signal according to a ratio of the input luminance signal and the output of the first luminance correction unit; and
a control unit, configured to control a correction ratio of the first luminance correction unit and a correction ratio of the second luminance correction unit, based on an output of the histogram detecting unit, and configured to control a correction ratio of the color difference correction unit.

2. The image signal processing device according to claim 1,
wherein the representative luminance calculating unit is configured to calculate the representative luminance from pixels in a predetermined peripheral area of an arbitrary pixel of the image.

3. The image signal processing device according to claim 1,
wherein, when the output of the histogram detecting unit exhibits distributions in high luminance and low luminance, the control unit controls the correction ratio of the first luminance correction unit and the correction ratio of the second luminance correction unit by use of a predetermined correction ratio and controls the correction ratio of the color difference correction unit, and
wherein, when the output of the histogram detecting unit exhibits fewer distributions in high luminance and low luminance, the control unit does not control the correction ratio of the first luminance correction unit and the correction ratio of the second luminance correction unit.

4. An image signal processing device comprising:
a luminance signal input unit, configured to be supplied with a luminance signal representing an image;
a representative luminance calculating unit, configured to detect a representative luminance in a predetermined area of the image represented by the luminance signal inputted via the luminance signal input unit;
a first correction unit, configured to
associate the predetermined area of the image to a brightness area of the image, wherein a plurality of brightness areas include: a dark area, an ordinary area, and a bright area, wherein each brightness area has a respective input-output characteristic function, and wherein at least the input-output characteristic function of the dark area is different from the input-output characteristic function of the bright area, and
correct the luminance signal inputted via the luminance signal input unit, according to an output of the representative luminance calculating unit, by use of the respective input-output characteristic function, by:
gradually adjusting the respective input-output characteristic function of the input luminance signal for the predetermined area of the image, and
suppressing any abrupt change of the input-output characteristic functions due to noise, thereby inhibiting a rupture of the image generated when an input-output characteristic function is discontinuous;
a second correction unit, configured to correct the luminance signal corrected by the first correction unit, by use of input-output characteristic functions which are uniform in a screen;
a luminance signal output unit, configured to output the luminance signal corrected by the first correction unit and the second correction unit;
a chrominance signal input unit, configured to be supplied with a chrominance signal;
a third correction unit, configured to correct the chrominance signal inputted via the chrominance signal input unit, by use of a ratio between: the luminance signal inputted from said luminance signal input unit, and the luminance signal corrected by said second correction unit; and
a chrominance signal output unit, configured to output the chrominance signal corrected by the third correction unit.

5. The image signal processing device according to claim 4,
wherein the representative luminance calculating unit is configured to calculate the representative luminance from pixels in a predetermined peripheral area of an arbitrary pixel of the image.

6. The image signal processing device according to claim 5,
wherein the representative luminance of the pixels in the predetermined peripheral area of the arbitrary pixel of the image is calculated by moving the predetermined area on a pixel-by-pixel basis.

7. The image signal processing device according to claim 4, further comprising:

a histogram detecting unit, configured to detect a luminance distribution of the luminance signal inputted via the luminance signal input unit.

8. The image signal processing device according to claim 7, wherein the second correction unit is configured to correct the luminance signal corrected by the first correction unit, by use of input-output characteristic functions which are uniform in a screen, according to the luminance distribution detected by the histogram detecting unit.

9. The image signal processing device according to claim 8, wherein the third correction unit is configured to correct the chrominance signal inputted via the chrominance signal input unit, by use of input-output characteristic functions which are set according to change of the luminance signal calculated from the input-output characteristic functions used in the first correction unit and the input-output characteristic functions used in the second correction unit.

10. An image signal processing device comprising:

a luminance signal input means for receiving a luminance signal representing an image;

a representative luminance calculating means for detecting a representative luminance in a predetermined area of the image represented by the luminance signal inputted via the luminance signal input means;

a first correction means, for
associating the predetermined area of the image to a brightness area of the image, wherein a plurality of brightness areas include: a dark area, an ordinary area, and a bright area, wherein each brightness area has a respective input-output characteristic function, and wherein at least the input-output characteristic function of the dark area is different from the input-output characteristic function of the bright area, and
correcting the luminance signal inputted via the luminance signal input means, according to an output of the representative luminance calculating unit, by use of the respective input-output characteristic function, by:
gradually adjusting the respective input-output characteristic function of the input luminance signal for the predetermined area of the image, and
suppressing any abrupt change of the input-output characteristic functions due to noise, thereby inhibiting a rupture of the image generated when an input-output characteristic function is discontinuous;

a histogram detecting means for detecting a luminance distribution of the luminance signal inputted via the luminance signal input means;

a second correction means for correcting the luminance signal corrected by the first correction means, by use of input-output characteristic functions which are uniform in a screen, according to the luminance distribution detected by the histogram detecting means;

a luminance signal output means for outputting the luminance signal corrected by the first correction means and the second correction means;

a chrominance signal input means for receiving a chrominance signal;

a third correction means for correcting the chrominance signal inputted via the chrominance signal input means, by use of input-output characteristic functions which are set according to change of the luminance signal calculated from the input-output characteristic functions used in the first correction means and the input-output characteristic functions used in the second correction means; and a chrominance signal output means for outputting the chrominance signal corrected by the third correction means.

11. The image signal processing device according to claim 10, wherein the representative luminance calculating means is a means for calculating the representative luminance from pixels in a predetermined peripheral area of an arbitrary pixel of the image.

* * * * *